US008879245B2

United States Patent
Kim

(10) Patent No.: US 8,879,245 B2
(45) Date of Patent: Nov. 4, 2014

(54) PROTECTIVE CASE FOR PORTABLE ELECTRONIC DEVICE

(75) Inventor: Dae-Young Kim, Seoul (KR)

(73) Assignee: Spigen SPG Korea (KR)

( * ) Notice: Subject to any disclaimer, the term of this patent is extended or adjusted under 35 U.S.C. 154(b) by 111 days.

(21) Appl. No.: 13/442,962

(22) Filed: Apr. 10, 2012

(65) Prior Publication Data

US 2012/0257340 A1 Oct. 11, 2012

(30) Foreign Application Priority Data

Apr. 11, 2011 (KR) .................... 20-2011-0003035 U

(51) Int. Cl.
*G06F 1/16* (2006.01)
*H04B 1/38* (2006.01)
*A45C 11/00* (2006.01)
*H04M 1/18* (2006.01)

(52) U.S. Cl.
CPC ........ *H04B 1/3888* (2013.01); *A45C 2011/002* (2013.01); *H04M 1/185* (2013.01)
USPC .............. 361/679.3; 361/679.55; 361/679.56; 206/320

(58) Field of Classification Search
USPC ........................................................ D14/250
See application file for complete search history.

(56) References Cited

U.S. PATENT DOCUMENTS

| 5,360,108 A * | 11/1994 | Alagia .......................... 206/320 |
| 7,295,430 B2 * | 11/2007 | Ohtaki et al. ............. 361/679.55 |
| 8,028,794 B1 * | 10/2011 | Freeman ....................... 181/202 |
| 8,190,222 B2 * | 5/2012 | Cheng ......................... 455/575.8 |
| 8,295,043 B2 * | 10/2012 | Tai et al. .................. 361/679.56 |
| D670,689 S * | 11/2012 | Wang ........................... D14/250 |
| 8,457,701 B2 * | 6/2013 | Diebel ........................ 455/575.8 |
| 2004/0149605 A1 * | 8/2004 | Ohtaki et al. ................. 206/320 |
| 2009/0114556 A1 * | 5/2009 | Tai et al. ....................... 206/320 |
| 2011/0049005 A1 * | 3/2011 | Wilson et al. ................. 206/701 |
| 2011/0297578 A1 * | 12/2011 | Stiehl et al. .................. 206/701 |
| 2012/0074006 A1 * | 3/2012 | Monaco et al. ............... 206/320 |

* cited by examiner

*Primary Examiner* — Anthony Q Edwards
(74) *Attorney, Agent, or Firm* — Park & Associates IP Law, P.C.

(57) ABSTRACT

A protective case for protecting a portable electronic device is provided. The case includes first and second bodies which cover the periphery of the electronic device, and locking parts which separably couple the first and second bodies to each other. Each body includes a lateral extension part which extends in a lateral direction, and longitudinal extension parts which extend in a longitudinal direction. The longitudinal extension parts include a longitudinal short side part which extends from an end of the lateral extension part, and a longitudinal long side part which extends from the other end of the lateral extension part. The locking parts are formed at junctions between the longitudinal long side part of the first body and the longitudinal short side part of the second body and between the longitudinal long side part of the second body and the longitudinal short side part of the first body.

8 Claims, 4 Drawing Sheets

PROTECTIVE CASE FOR PORTABLE ELECTRONIC DEVICE

PRIORITY

This application claims the benefit under 35 U.S.C. §119(a) of a Korean patent application filed on Apr. 11, 2010 in the Korean Intellectual Property Office and assigned Serial No. 20-2011-0003035, the entire disclosure of which is hereby incorporated by reference.

BACKGROUND OF THE INVENTION

1. Field of the Invention

The present invention relates generally to protective cases for portable electronic devices. More particularly, the present invention relates to a protective case for portable electronic devices which can provide a protective function focused on the periphery of a portable electronic device, facilitate the operation of coupling the protective case to the electronic device or removing it therefrom, and reliably maintain its coupled state.

2. Description of the Related Art

Portable electronic devices refer not only to smartphones, such as I-phones, Android phones, etc., but also to different kinds of electronic devices, for example, electronic dictionary devices, MP3 players, game players, and so on. Though there are a variety of portable electronic devices, among them, so-called bar-type devices, which have a display panel on the front thereof, have recently been gaining popularity.

The display panels of such portable electronic devices are generally vulnerable to impact, so if the devices drop onto the ground, it may cause problems, for example, of damage to the display panels. Therefore, protective cases are typically used to protect the portable electronic devices from impact.

Such protective cases for portable electronic devices are developing along with the growth of portable electronic devices. Rather than a type that covered the entire area of a portable electronic device as in the past, a bumper style protective case, which wraps the periphery of the portable electronic device while allowing the front surface of the electronic device to be open, has recently been gathering popularity.

Such bumper style protective cases are classified into two kinds: one is made of an elastic material such as rubber or the like and wraps the periphery of a portable electronic device; and the other includes two bodies that are made of a material that is harder than rubber and can be removably coupled to each other.

The former has an integrated structure, making the use thereof easy, but if the elasticity of the rubber becomes weak, it may stretch and not be able to come into close contact with a portable electronic device, thus reducing the lifetime thereof.

On the other hand, the latter can mitigate the problem of rubber being stretched as time goes by, but because it is typically configured such that locking parts are formed at left and right sides on two bodies of the protective case at the same level, the locking of the locking parts is undesirably easily released by a force that is applied to the protective case in the longitudinal direction. In addition, coupling two bodies to each other or separating them from each other is far from convenient.

Therefore, an improved protective case is required, which particularly wraps the periphery of a bar-type portable electronic device to protect the device, and that can not only facilitate coupling the protective case to the device, but can also enhance the durability thereof.

Therefore, a need exists for a system and method for performing a self diagnosis of a device without the inconvenience caused when manually selecting a self diagnosis item from a computer or a user interface

SUMMARY OF THE INVENTION

Aspects of the present invention are to address at least the above-mentioned problems and/or disadvantages and to provide at least the advantages described below. Accordingly, an aspect of the present invention is to provide a protective case for portable electronic devices which is separable into two bodies and wraps the periphery of a portable electronic device, wherein locking parts are disposed at positions not aligned with each other rather than being level with each other, thus not only preventing an external force applied to a portion of the protective case from undesirably easily removing the protective case from the portable electronic device, but also facilitating the operation of coupling the protective case to the electronic device thanks to both using a length difference between the opposite sides of the corresponding body based on the locking parts and using the elasticity of the body.

Another aspect of the present invention is to provide a protective case for portable electronic devices in which each locking part has an insertion coupling structure using a protrusion and a depression, thus facilitating the operation of coupling the protective case to a portable electronic device or removing it therefrom.

Another aspect of the present invention is to provide a protective case for portable electronic devices in which a stopper is provided on a locking hook, and a stop protrusion is provided on a corresponding locking catch, so that the locking hook can be smoothly coupled to or removed from the locking catch in a sliding manner, thus further facilitating the coupling or removing operation.

In accordance with an aspect of the present invention, a protective case for portable electronic devices is provided. The protective case includes first and second bodies covering the side surfaces and portions of perimeters of front and rear surfaces of the portable electronic device in such a way that the first and second bodies are coupled to each other, each of the first and second bodies having a lateral extension part extending in a lateral direction of the portable electronic device, and longitudinal extension parts extending from opposite ends of the lateral extension part in a longitudinal direction, the longitudinal extension parts having a longitudinal short side part and a longitudinal long side part longer than the longitudinal short side part, and locking parts formed on respective junctions between the longitudinal long side part of the first body and the longitudinal short side part of the second body and between the longitudinal long side part of the second body and the longitudinal short side part of the first body, the locking parts removably coupling the first and second bodies to each other.

The longitudinal long side part may be four to six times longer than the longitudinal short side part.

Furthermore, the locking parts may include locking hooks provided on respective ends of the longitudinal long side parts of the first and second bodies, and locking catches formed in respective ends of the longitudinal short side parts of the first and second bodies, wherein each of the locking hooks and the corresponding locking catch are removably coupled to each other.

In addition, each of the locking hooks may include a stopper protruding from an end of the locking hook in a direction opposing the portable electronic device. Each of the locking catches may include a slope that is depressed such that a depth thereof is increased towards an end of the locking catch, and a stop protrusion protruding from a lower end of the slope in a direction perpendicular to the longitudinal short side part. The stopper may be removably fastened in a space defined by the slope around the stop protrusion.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
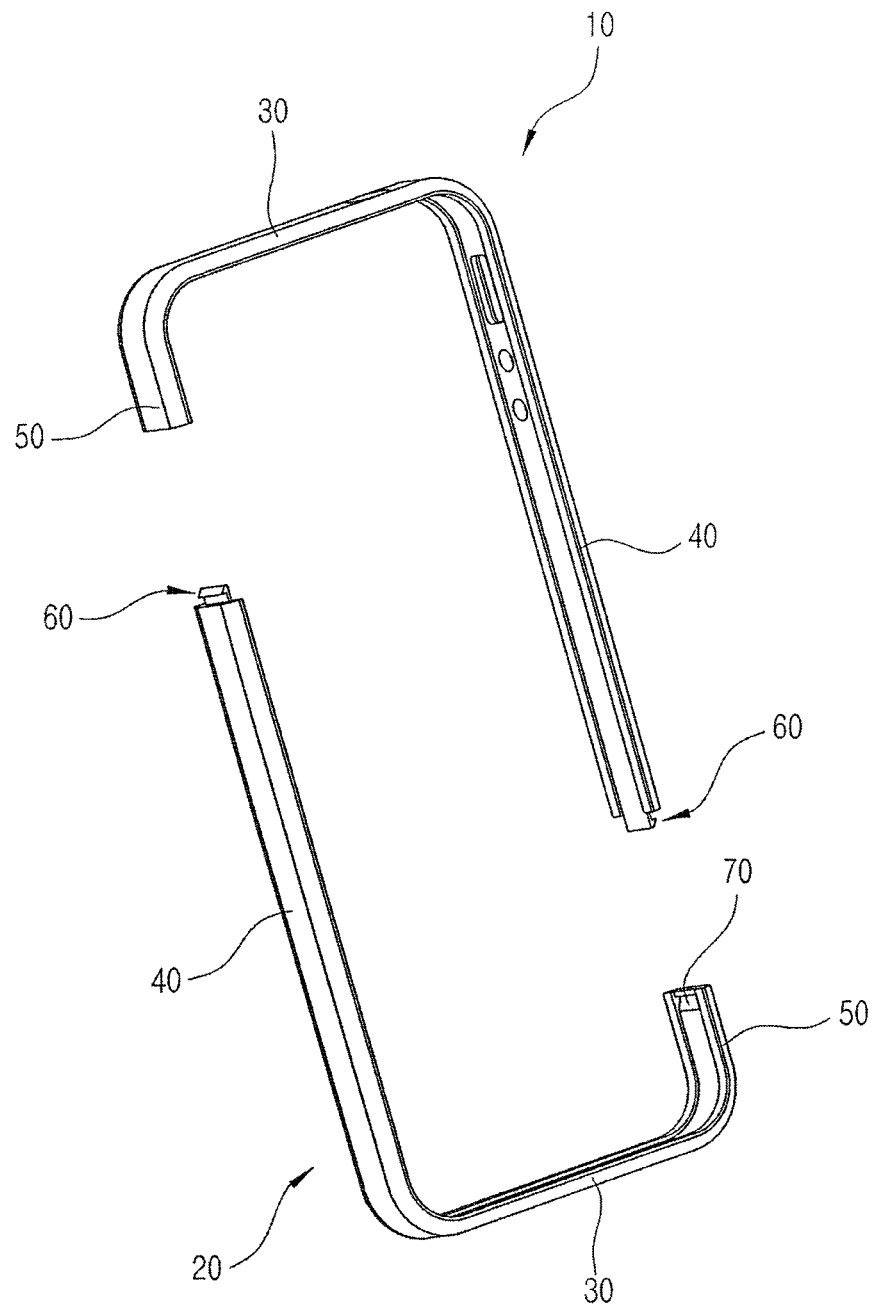
FIG. 1 is a perspective view illustrating the construction of a protective case for portable electronic devices, according to an exemplary embodiment of the present invention.
Figure 2:
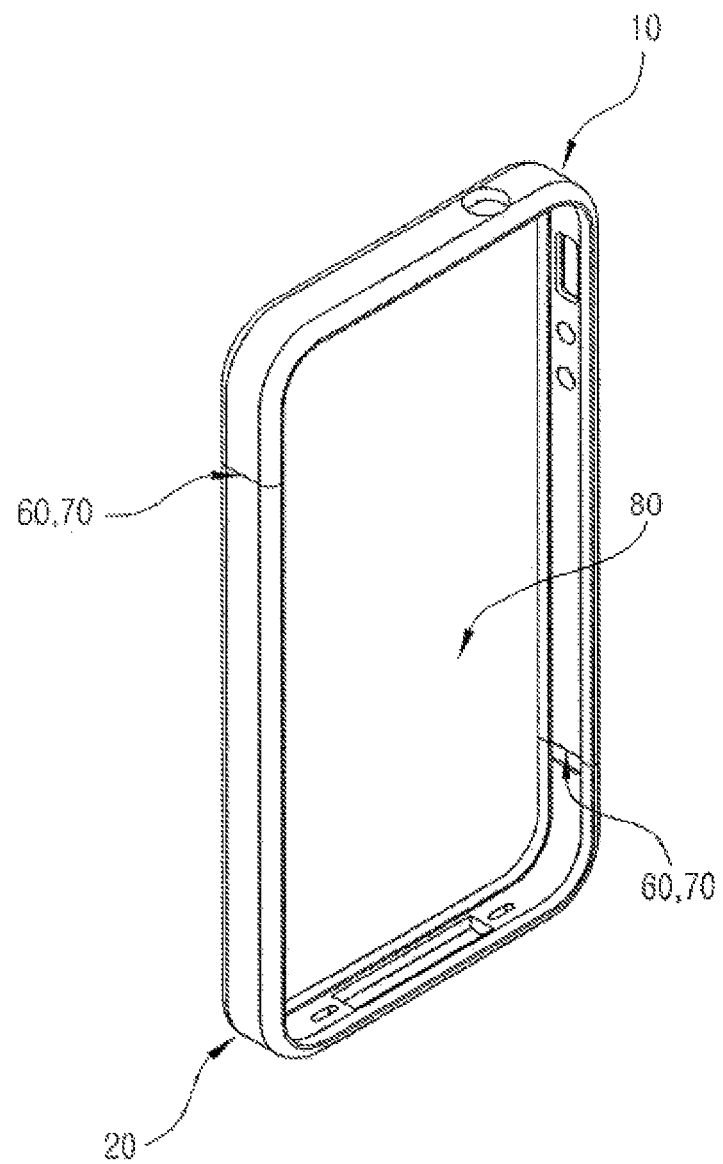
FIG. 2 is a perspective view showing the assembled protective case for portable electronic devices according to an exemplary embodiment of the present invention.

FIG. 1 is a perspective view illustrating the construction of a protective case for a portable electronic device, according to an exemplary embodiment of the present invention. FIG. 2 is a perspective view showing the assembled protective case according to an exemplary embodiment of the present invention.

The protective case according to the present invention is used, among different kinds of portable electronic devices, particularly, for bar-type devices that are provided with a display panel in front thereof. Such electronic devices can be smartphones, mobile video players or game players, or the like.

The protective case of the present invention is reliably fitted over such a portable electronic device without covering a display panel provided in front of the device, and functions to absorb an impact applied to the device and prevent the device from being scratched.

In detail, the protective case according to the present invention includes first and second bodies 10 and 20 which mainly come into close contact with the periphery of a portable electronic device and partially cover the perimeters of front and rear surfaces of the portable electronic device. The first and second bodies 10 and 20 are separately formed from each other and are removably coupled to each other by locking parts.

A recess is formed in an inner surface of each of the first and second bodies 10 and 20. The bottom of the recess is a portion that comes into close contact with the periphery of the portable electronic device. The sidewalls of the recess are respectively placed onto the front and rear surfaces of the portable electronic device, thus partially covering the perimeters of the front and rear surfaces of the portable electronic device.

Preferably, the material of each of the first and second bodies 10 and 20 has predetermined elasticity to ensure locking and releasing of the locking part.

Referring to FIGS. 1 and 2, the shapes of the first and second bodies 10 and 20 are symmetrical to each other. The first and second bodies 10 and 20 are separably coupled to each other by the two locking parts that are provided on the respective junctions between the first and second bodies 10 and 20.

Figure 4:
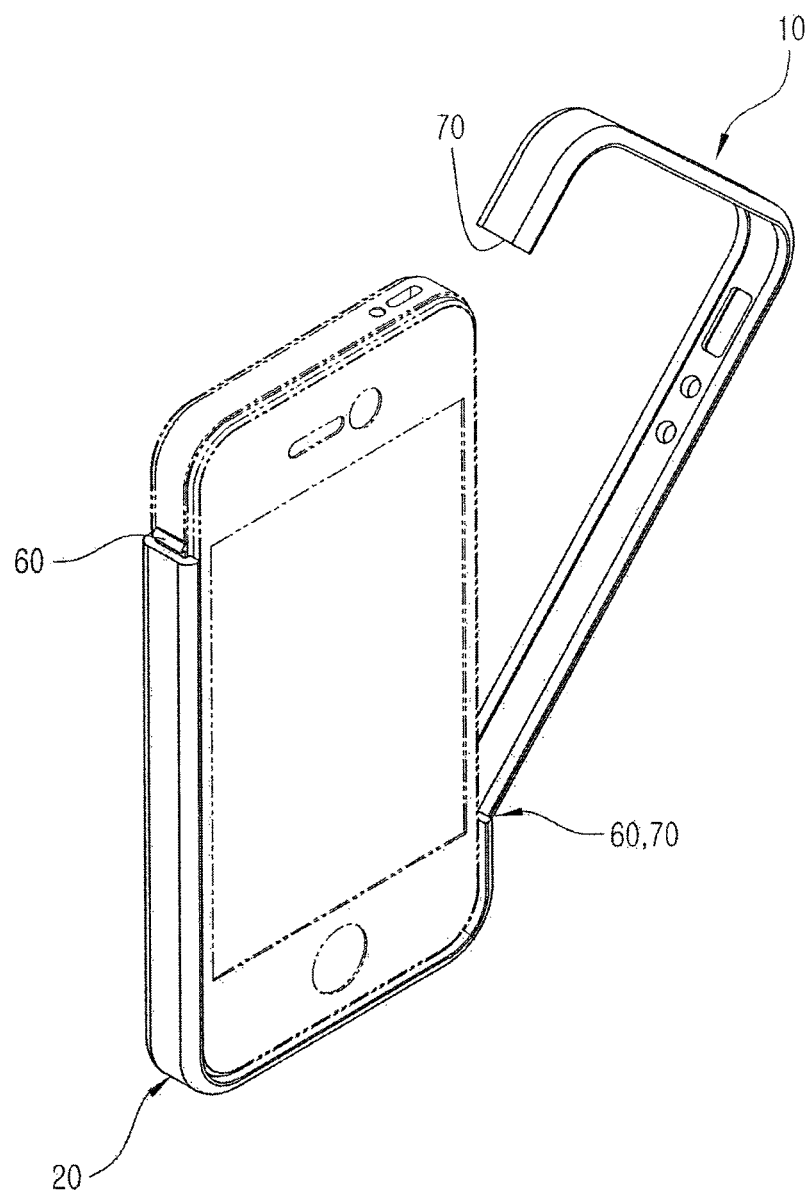
FIG. 4 is a view showing an example of the operation of the protective case in which when either locking part is released, the other locking part functions as a fulcrum of a lever, according to an exemplary embodiment of the present invention.

In detail, based on a portable electronic device, the longitudinal length of which is longer than the lateral length thereof, (in other words, as shown in FIG. 4, the portable electronic device being an approximately rectangular parallelepiped has four side surfaces including two short side surfaces and two long side surfaces), each of the first and second bodies 10 and 20 includes a lateral extension part 30 which extends in the horizontal (lateral) direction and comes into close contact with a corresponding one of short side surfaces of the portable electronic device, and longitudinal extension parts 40 and 50 which respectively extend from opposite ends of the lateral extension part 30 in the vertical (longitudinal) direction and come into close contact with portions of two long side surfaces of the portable electronic device. The longitudinal extension parts 40 and 50 comprise a longitudinal short side part 50 which is disposed on one end of the lateral extension part 30, and a longitudinal long side part 40 which is disposed on the other end of the lateral extension part 30 and is longer than the longitudinal short side part 50.

For this construction, the general shape of each of the first and second bodies 10 and 20 is similar to that of the numeral '7'. The longitudinal long side part 40 of the first body 10 is coupled to the longitudinal short side part 50 of the second body 20 while the longitudinal long side part 40 of the second body 20 is coupled to the longitudinal short side part 50 of the first body 10, thus forming an overall rectangular plan shape.

Particularly, the longitudinal long side part 40 is four to six times longer than the longitudinal short side part 50. In other words, the longitudinal long side part 40 makes up about 80% to 85% of the entire longitudinal length of the protective case.

Furthermore, the locking parts are respectively formed on the junction between the longitudinal long side part 40 of the first body 10 and the longitudinal short side part 50 of the second body 20 and between the longitudinal long side part 40 of the second body 20 and the longitudinal short side part 50 of the first body 10.

Figure 3:
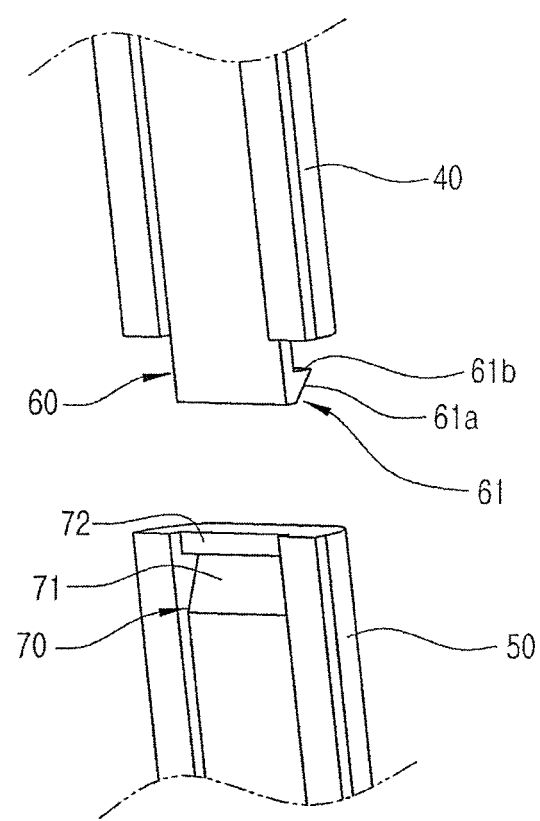
FIG. 3 is an enlarged perspective view showing a locking part of the protective case according to an exemplary embodiment of the present invention.

FIG. 3 is an enlarged view showing the locking part according to an exemplary embodiment of present invention.

Each locking part according to the present invention forms a releasable locking structure using protrusion-depression coupling, which is formed on each junction between the ends of the first and second bodies 10 and 20. Comparing the locking part to the protrusion-depression structure, a locking catch 70 that refers to the depression and a locking hook 60 that refers to the protrusion are respectively provided on the ends of each of the first and second bodies 10 and 20.

In detail, preferably, the locking hook 60 is provided on the end of each of the longitudinal long side parts 40 of the first and second bodies 10 and 20, while the locking catch 70 is formed in an end of each of the longitudinal short side parts 50 of the first and second bodies 10 and 20.

The locking hook 60 extends outwards from the end of each longitudinal long side part 40 of the first and second bodies 10 and 20 in the longitudinal direction. Further, a stopper 61 protrudes from the end of each locking hook 60 outwards (in a direction opposing the portable electronic device) such that the stopper 61 is thicker than the portion of the locking hook 60 other than the stopper 61.

The stopper 61 of each of the first and second bodies 10 and 20 includes an inclined portion 61*a* which extends from the end of the longitudinal long side part 40 and is inclined outwards and downwards, and a connection portion 61*b* which linearly connects a top edge of the inclined portion 61*a* to a portion of the locking hook 60.

Corresponding to the locking hook 60, the locking catch 70 of each of the first and second bodies 10 and 20 includes a slope 71 and a stop protrusion 72. The slope 71 is configured such that it is depressed and inclined downwards from a position which is spaced apart from the end of the longitudinal short side part 50 by a predetermined distance towards the lateral extension part 30, and the depth thereof is deepest at a position adjacent to the end of the longitudinal short side part 50. The stop protrusion 72 protrudes from the deepest end of the slope 71 in a direction perpendicular to the longitudinal short side part 50.

The function and operation of the protective case according to the present invention having the above-mentioned construction will now be explained.

Among protective cases that comprise two bodies which are separable from each other or foldable onto each other, the protective case of the present invention is proposed to prevent problems of protective cases in which an upper cover and a lower cover are separated from each other or two bodies are separably coupled to each other by two locking parts which are disposed at the same level.

An upper/lower cover separating (folding) protective case is inconvenient in that, because the upper cover covers the front display panel of an electronic device, a user must open the upper cover to see the display panel. In a protective case in which two locking parts are formed in left and right longitudinal extension parts at the same level, force of the same magnitude is simultaneously transferred from lateral extension parts to the left and right locking parts that are disposed at the same level. Thereby, the protective case may be excessively easily separated into two parts. To avoid the above problem, if the coupling force of the locking parts is strengthened or a horizontal line on which the locking parts are disposed is located at the medial portions of the longitudinal extension parts, another problem is caused in which it may be excessively difficult to couple the protective case to an electronic device or remove it therefrom.

However, in the protective case of the present invention, as can be appreciated in the drawings, the left and right locking parts are not level with each other, that is, are not aligned with each other with respect to a horizontal line, but form a symmetrical structure, so that not only can the display panel of the portable electronic device be open but the structure of the present invention can also prevent external force transferred from the lateral extension parts 30 from excessively easily separating the protective case from the portable electronic device.

In other words, the locking parts are not disposed at the same level, that is, are not aligned with the horizontal line, but are disposed such that the first and second bodies are symmetrical with each other, thus providing a balanced-coupling force between the first and second bodies, thereby preventing an external force applied to a portion of the protective case from excessively easily removing the protective case from the portable electronic device.

FIG. 4 is a view showing an example of the operation of the protective case in which when either locking part is released, the other locking part functions as a fulcrum of a lever, according to an exemplary embodiment of present invention.

Referring to FIG. 4, to couple the first and second bodies 10 and 20 to each other or separate them from each other, when the locked state of either locking part is released, the other locking part functions as a fulcrum of a lever or a hinge, thus promoting smooth rotation of the body that is being removed from the other body, thereby facilitating the separation of the first and second bodies 10 and 20 from each other.

In detail, when the user releases either locking part, for example, the locking part pertaining to the longitudinal short side part 50 of the first body 10, and lifts out (takes off) the longitudinal short side part 50 of the first body 10 from the portable electronic device, the locking part of the other side, rather than being immediately released, functions as a hinge until the first body 10 is taken off to some degree. Subsequently, the locked state of the locking part of the other side is eventually released, and thereafter the second body 20 can also be removed from the portable electronic device.

Particularly, the reason why the short side part 50 is four to six times shorter than the longitudinal long side part 40 is to facilitate taking off the longitudinal short side part 50 of the body. If the longitudinal short side part 50 is longer than that proposed above, the user must bend the body upwards or downwards and remove it from the electronic device rather than moving the body away from the portable electronic device as if taking it off with the corner of the portable electronic device as its starting point. In this case, however high the elasticity of the material of the body is, the fatigue of the body is increased, eventually resulting in increasing a probability of the body being deformed or broken.

Furthermore, in the present invention, the stopper 61 of each locking hook 60 is disposed in the corresponding locking catch 70 that is formed at an inner surface of the longitudinal short side part 50, particularly, in the deepest portion of the slope 71 that is adjacent to the stop protrusion 72. In this state, if the user lifts up the end of the longitudinal short side part 50 in which the slope 71 is formed, the longitudinal short side part 50 to which force is applied is naturally removed from the stopper 61 of the locking hook 60 as if the stopper 61 slips along the ramp of the slope 71. On the contrary to this, when the locking hook 60 and the locking catch 70 are in the coupled state, the stopper 61 that protrudes outwards can be maintained in a state of being locked to the stop protrusion 72 without being easily removed from the slope 71, thus providing sufficient coupling force therebetween.

In brief, coupling the protective case of the present invention to the portable electronic device includes disposing the first body 10 on the corresponding side surface of the portable electronic device, and inserting the locking hook 60 of the longitudinal long side part 40 of the second body 20 into the locking catch 70 formed in the longitudinal short side part 50 of the first body 10. Then, the locked locking part functions as a hinge, without allowing the locking hook 60 and the locking catch 70 to be separated from each other, thus allowing the locking part of the other side to elastically bend and enter the locked state while the first body 10 rotates around the locking part that is already locked. Here, locking of the locking part of the other side can be easily realized by pushing the locking part, and fitting the locking catch 70 (in detail, a portion of the slope around the stop protrusion) of the longitudinal short side part 50 of the first body 10 over the locking hook stopper 60 of the longitudinal long side part 40 of the second body 20 until it clicks.

Removing the protective case of the present invention from the portable electronic device can be carried out in an opposite way to the above.

The reason why the stopper 61 of the locking hook 60 is configured such that it protrudes outwards and is releasably locked to the stop protrusion 72 is also to prevent a force pulling the protective case in the longitudinal direction from easily unlocking the stopper 61 and the stop protrusion 72 from each other but to allow a force lifting up the longitudinal short side part 50 from the portable electronic device to easily release the locked state of the locking part of the corresponding side while the locking part of the other side is functioning as a hinge, making it easy to take off the corresponding body from the portable electronic device.

Preferably, the material for the first and second bodies is either a metal or a synthetic resin, and other different kinds of materials may also be used.

Referring again to FIG. 2, the protective cover of the present invention may further include a rear cover 80 that covers the rear surface of the portable electronic device, as well as including the first and second bodies 10 and 20. In this case, the assembly of the first and second bodies 10 and 20 and the cover 80 can not only protect the front and side surfaces of the portable electronic device, but can also protect the rear surface.

As described above, a protective case for portable electronic devices according to the present invention has the following effects.

First, because two locking parts are disposed at positions not aligned with each other with respect to the horizontal direction rather than being level with each other, it prevents a force applied thereto in the vertical direction from undesirably easily releasing the locked state of the locking parts.

Second, a longitudinal long side part of each body is four to six times longer than a longitudinal short side part of the body. Therefore, the protective case can be fitted over or taken off a portable electronic device in such a way that the longitudinal short side part of either body moves over the corresponding corner of the portable electronic device, thus facilitating installation or removal of the protective case without the first or second body being strained.

Third, thanks to the configuration of a length difference between the longitudinal long side part and the longitudinal short side part, when the locking part of either side (a first side) enters a locked state or is released from the locked state, the locking part of the other side (the second side) can function as a hinge. Thereby, the body that is rotating around the locking part that functions as the hinge can be smoothly moved, thus facilitating the operation of locking or releasing the locking part of the first side.

Fourth, the locking part of each side uses a locking hook including a stopper that protrudes outwards and a locking catch including a slope and a stop protrusion, thus ensuring reliable locking force and facilitating the operation of locking or releasing the locking part.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A protective case for protecting a portable electronic device having a display panel on a front surface thereof, two short side surfaces and two long side surfaces, the protective case comprising:
    first and second bodies covering the side surfaces and portions of perimeters of front and rear surfaces of the portable electronic device in such a way that the first and second bodies are coupled to each other, each of the first and second bodies comprising: a lateral extension part coming into close contact with one of the short side surfaces of the portable electronic device; and longitudinal extension parts having a longitudinal short side part extending from a first end of the lateral extension part in a longitudinal direction, the longitudinal short side part coming into contact with a portion of one of the two long side surfaces of the portable electronic device, and a longitudinal long side part extending from a second end of the lateral extension part in the longitudinal direction and being longer than the longitudinal short side part, the longitudinal long side part coming into contact with a portion of a remaining one of the two long side surfaces of the portable electronic device; and
    locking parts formed on respective junctions between the longitudinal long side part of the first body and the longitudinal short side part of the second body and between the longitudinal long side part of the second body and the longitudinal short side part of the first body, the locking parts removably coupling the first and second bodies to each other, wherein the respective junctions are unaligned in a horizontal direction, and a coupled state of a first respective junction with an uncoupled state of a second respective junction creates a hinge at the first respective junction.

2. The protective case as set forth in claim 1, wherein the longitudinal long side part is four to six times longer than the longitudinal short side part.

3. The protective case as set forth in claim 1, wherein the locking parts comprise:
    locking hooks provided on respective ends of the longitudinal long side parts of the first and second bodies; and
    locking catches formed in respective ends of the longitudinal short side parts of the first and second bodies,
    wherein each of the locking hooks and the corresponding locking catch are removably coupled to each other.

4. The protective case as set forth in claim 3,
wherein each of the locking hooks comprises a stopper protruding from an end of the locking hook in a direction opposing the portable electronic device, and
each of the locking catches comprises: a slope that is depressed such that a depth thereof is increased towards an end of the locking catch; and a stop protrusion protruding from a lower end of the slope in a direction perpendicular to the longitudinal short side part,
wherein the stopper is removably fastened in a space defined by the slope around the stop protrusion.

5. The protective case as set forth in claim 4, wherein the stopper comprises:
an inclined portion extending to be inclined downwards with respect to the direction opposing the portable electronic device; and
a connection portion linearly connecting a top edge of the inclined portion to a portion of the locking hook.

6. The protective case as set forth in claim 1, wherein a recess is formed in an inner surface of each of the first and second bodies,
wherein a bottom of the recess comes into contact with the side surfaces of the portable electronic device, while sidewalls of the recess come into contact with portions of perimeters of front and rear surfaces of the portable electronic device.

7. The protective case as set forth in claim 1, further comprising
a cover coupled to the first and second bodies, the cover covering a rear surface of the portable electronic device.

8. The protective case as set forth in claim 1, wherein each of the first and second bodies is made of either a metal or a synthetic resin.

* * * * *